US011964489B2

(12) United States Patent
Somete et al.

(10) Patent No.: US 11,964,489 B2
(45) Date of Patent: Apr. 23, 2024

(54) INKJET RECORDING APPARATUS

(71) Applicant: KYOCERA Document Solutions Inc., Osaka (JP)

(72) Inventors: Takashi Somete, Osaka (JP); Chikara Ishihara, Osaka (JP); Noriaki Furukawa, Osaka (JP); Takuma Araki, Osaka (JP); Jun Nakano, Osaka (JP); Hiroomi Nakatsuji, Osaka (JP); Issei Nakano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 124 days.

(21) Appl. No.: 17/700,047

(22) Filed: Mar. 21, 2022

(65) Prior Publication Data

US 2022/0305791 A1 Sep. 29, 2022

(30) Foreign Application Priority Data

Mar. 24, 2021 (JP) ................................. 2021-049539

(51) Int. Cl.
*B41J 2/165* (2006.01)
*B41J 11/00* (2006.01)

(52) U.S. Cl.
CPC ....... *B41J 2/16523* (2013.01); *B41J 2/16532* (2013.01); *B41J 11/007* (2013.01); *B41J 11/0085* (2013.01)

(58) Field of Classification Search
CPC .. B41J 2/16523; B41J 2/16532; B41J 11/007; B41J 11/0085; B41J 2/16535;
(Continued)

(56) References Cited

U.S. PATENT DOCUMENTS 8,267,511 B2 * 9/2012 Takahashi ............ B41J 2/16585 347/14
11,413,872 B2 * 8/2022 Maruta ................ B41J 2/16585
(Continued)

FOREIGN PATENT DOCUMENTS

CN 1367080 A 9/2002
CN 1693082 A 11/2005
(Continued)

OTHER PUBLICATIONS

Chinese Office Action dated May 25, 2023, issued by the China National Intellectual Property Administration in corresponding application CN 202210288753.1.
(Continued)

*Primary Examiner* — Sharon Polk
(74) *Attorney, Agent, or Firm* — Stein IP, LLC

(57) ABSTRACT

An inkjet recording apparatus includes a recording head including a plurality of nozzles for ejecting ink, a conveyor belt that has a plurality of apertures and conveys recording media one by one, a control unit, an ink receiver, and a pipe-shaped ink discharge flow path. The control unit controls drive of the recording head and the conveyor belt to perform flushing, in which the ink is ejected from the nozzle of the recording head to pass through one of the apertures, at a timing different from a timing contributing to image recording. The ink receiver is disposed to face the recording head sandwiching the conveyor belt therebetween, to receive the ink after passing through the aperture when the flushing is performed. The ink discharge flow path is connected to the ink receiver. When the flushing is performed, a predetermined amount of liquid is stored in the ink receiver.

9 Claims, 11 Drawing Sheets

(58) Field of Classification Search
CPC .......... B41J 2002/16558; B41J 2/16508; B41J 2/16526; B41J 2002/16514; B41J 2002/16591; B41J 2/1652
See application file for complete search history.

(56) References Cited

U.S. PATENT DOCUMENTS

2002/0008722 A1 1/2002 Imanaka et al. ................ 347/14
2002/0008724 A1 1/2002 Kubota et al. .................. 347/19
2002/0030710 A1 3/2002 Mochizuki et al. ............ 347/19
2002/0033855 A1 3/2002 Kubota et al. .................. 347/19
2002/0033859 A1* 3/2002 Mitsuzawa .......... B41J 2/16505 347/29
2002/0154181 A1 10/2002 Kubota et al. .................... 347/7
2004/0036733 A1 2/2004 Kubota et al. .................. 347/19
2004/0036734 A1 2/2004 Mochizuki et al. ............ 347/19
2005/0248607 A1 11/2005 Matsuba et al. ................ 347/24
2006/0203032 A1 9/2006 Takagi ............................ 347/29
2006/0209120 A1 9/2006 Takagi ............................ 347/29
2007/0146409 A1 6/2007 Kubota et al. .................. 347/19
2010/0149242 A1 6/2010 Takahashi et al. ............. 347/14
2010/0231676 A1 9/2010 Miyagi ......................... 347/104
2011/0227980 A1 9/2011 Saitoh et al. ................... 347/14
2021/0309009 A1* 10/2021 Yamashita ............... B41J 13/28
2021/0402809 A1* 12/2021 Ito ........................ B41J 2/16517

FOREIGN PATENT DOCUMENTS

CN 1827376 A 9/2006
JP 2010-167586 A 8/2010
JP 2010-241109 A 10/2010
JP 2011-213095 A 10/2011

OTHER PUBLICATIONS

Second Office Action from the Chinese Patent Office dated Dec. 21, 2023, issued to Chinese Application No. 202210288753.1.

* cited by examiner

INKJET RECORDING APPARATUS

INCORPORATION BY REFERENCE

This application is based upon and claims the benefit of priority from the corresponding Japanese Patent Application No. 2021-049539 filed Mar. 24, 2021, the entire contents of which are hereby incorporated by reference.

BACKGROUND

The present disclosure relates to an inkjet recording apparatus.

Conventionally, in an inkjet recording apparatus such as an inkjet printer, in order to reduce or prevent nozzle clogging due to ink drying, flushing (idle discharge) for discharging ink from the nozzle is performed regularly. For instance, in an inkjet recording apparatus, a conveyor belt for conveying a recording medium is provided with apertures, and ink is ejected from the nozzles of a recording head and passes through the apertures of the conveyor belt.

In the inkjet recording apparatus described above, the ink after passing through the aperture of the conveyor belt during flushing usually reaches an ink receiver for receiving ink, is collected by the same, and is discharged as liquid waste from the ink receiver. However, the ink that reaches the ink receiver is often dried, and the flowability is lowered. The ink having low flowability accumulates on the ink receiver and is adhered to the conveyor belt, which causes the recording medium to be stained. In addition, solidified ink clogs an ink discharge flow path and causes pollution inside the apparatus or breakdown of the apparatus.

SUMMARY

An inkjet recording apparatus according to one aspect of the present disclosure includes a recording head, a conveyor belt, a control unit, an ink receiver, and an ink discharge flow path. The recording head has a plurality of nozzles for ejecting ink. The conveyor belt has a plurality of apertures and conveys recording media one by one. The control unit controls drive of the recording head and the conveyor belt so as to perform flushing, in which the ink is ejected from the nozzle of the recording head so as to pass through one of the plurality of apertures, at a timing different from a timing contributing to image recording. The ink receiver is disposed to be opposed to the recording head sandwiching the conveyor belt therebetween, so as to receive the ink after passing through the aperture when the flushing is performed. The ink discharge flow path is connected to the ink receiver. When the flushing is performed, a predetermined amount of liquid is stored in the ink receiver.

DETAILED DESCRIPTION

[1. Structure of Inkjet Recording Apparatus]

Figure 1:
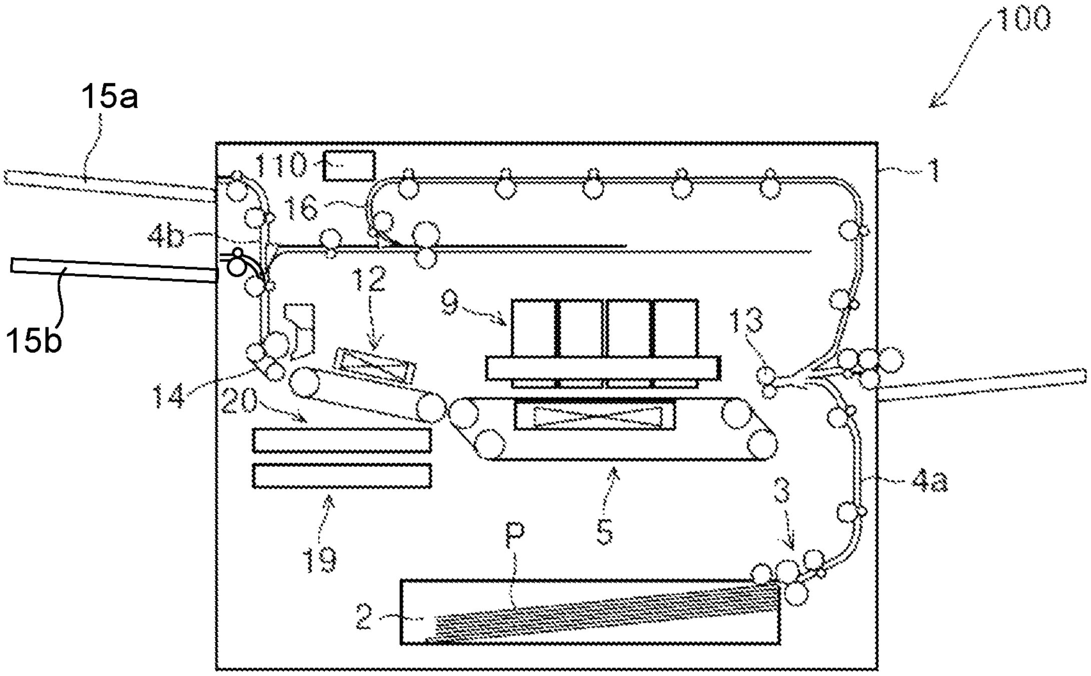
FIG. 1 is an explanatory diagram illustrating a schematic structure of a printer as an inkjet recording apparatus according to an embodiment of the present disclosure.

Hereinafter, with reference to the drawings, embodiments of the present disclosure are described. FIG. 1 is an explanatory diagram illustrating a schematic structure of a printer 100 as an inkjet recording apparatus according to an embodiment of the present disclosure. The printer 100 includes a sheet feed cassette 2 that is a paper sheet storing unit. The sheet feed cassette 2 is disposed at a lower part in a printer main body 1. Inside the sheet feed cassette 2, paper sheets P as recording media are stored.

A sheet feeding device 3 is disposed at a downstream side of the sheet feed cassette 2 in a sheet conveying direction, i.e. an upper right side of the sheet feed cassette 2 in FIG. 1. The sheet feeding device 3 separates and sends out the paper sheets P one by one to the upper right side of the sheet feed cassette 2 in FIG. 1.

The printer 100 has a first sheet conveying path **4*a* inside. The first sheet conveying path 4*a* is disposed on the upper right side of the sheet feed cassette 2 that is a sheet feeding direction thereof. The paper sheet P sent out from the sheet feed cassette 2 is conveyed upward vertically by the first sheet conveying path 4*a* along a side surface of the printer main body 1**.

A registration roller pair 13 is disposed at a downstream end of the first sheet conveying path **4*a* in the sheet conveying direction. Further, a first conveying unit 5 and a recording unit 9 are disposed just near the downstream side of the registration roller pair 13 in the sheet conveying direction. The paper sheet P sent out from the sheet feed cassette 2 passes through the first sheet conveying path 4***a* and reaches the registration roller pair 13. The registration roller pair 13 corrects a skew of the paper sheet P, and sends out the paper sheet P to the first conveying unit 5 (in particular, a first conveyor belt 8 described later), in synchronization with an ink ejecting operation performed by the recording unit 9.

The paper sheet P sent out to the first conveying unit 5 by the registration roller pair 13 is conveyed by the first conveyor belt 8 to a position facing the recording unit 9 (in particular, recording heads 17*a* to 17*c* described later). As the recording unit 9 ejects ink to the paper sheet P, an image is recorded on the paper sheet P. In this case, ink ejection from the recording unit 9 is controlled by a control device 110 inside the printer 100.

A second conveying unit 12 is disposed on the downstream side (the left side in FIG. 1) of the first conveying unit 5 in the sheet conveying direction. The paper sheet P with an image recorded by the recording unit 9 is sent to the second conveying unit 12. Ink ejected to the surface of the paper sheet P is dried while passing through the second conveying unit 12.

A decurler unit 14 is disposed on the downstream side of the second conveying unit 12 in the sheet conveying direction, i.e. near the left side surface of the printer main body 1. The paper sheet P with ink dried by the second conveying unit 12 is sent to the decurler unit 14, in which a curl of the paper sheet P is corrected.

A second sheet conveying path 4*b* is disposed on the downstream side (the upper side in FIG. 1) of the decurler unit 14 in the sheet conveying direction. If double side recording is not performed, the paper sheet P after passing through the decurler unit 14 passes through the second sheet conveying path 4*b* and is discharged onto a sheet discharge tray 15*a* that is disposed outside the left side surface of the printer 100. Below the sheet discharge tray 15*a*, there is disposed a sub discharge tray 15*b* for discharging unnecessary paper sheets P (loss paper sheets) with printing failure or the like.

A reverse conveying path 16 for performing the double side recording is arranged above the recording unit 9 and the second conveying unit 12, in an upper part of the printer main body 1. When the double side recording is performed, the paper sheet P after recording on one side (first side) of the paper sheet P is finished, and after passing through the second conveying unit 12 and the decurler unit 14, passes through the second sheet conveying path 4*b* and is sent to the reverse conveying path 16.

Next, the paper sheet P sent to the reverse conveying path 16 is switched in the conveying direction for recording on the other side (second side) of the paper sheet P. Then, the paper sheet P passes in the upper part of the printer main body 1, is sent to the right side, and is sent through the registration roller pair 13 to the first conveying unit 5 again, with the second side facing up. In the first conveying unit 5, the paper sheet P is conveyed to a position facing the recording unit 9, and the recording unit 9 ejects ink so that an image is recorded on the second side. The paper sheet P after the double side recording passes through the second conveying unit 12, the decurler unit 14, and the second sheet conveying path 4*b* in order, and is discharged onto the sheet discharge tray 15*a*.

In addition, a maintenance unit 19 and a cap unit 20 are disposed below the second conveying unit 12. The maintenance unit 19 moves horizontally to below the recording unit 9 when performing purging, wipes out ink pushed out from an ink ejection port of the recording head, and collects the wiped ink. Note that the purging is an operation of forcedly pushing out ink from the ink ejection port of the recording head, so as to discharge thickened ink, foreign objects, and air bubbles in the ink ejection port. The cap unit 20 moves horizontally to below the recording unit 9 and further moves upward, when capping the ink ejecting surface of the recording head, so as to be attached to a lower surface of the recording head.

Figure 2:
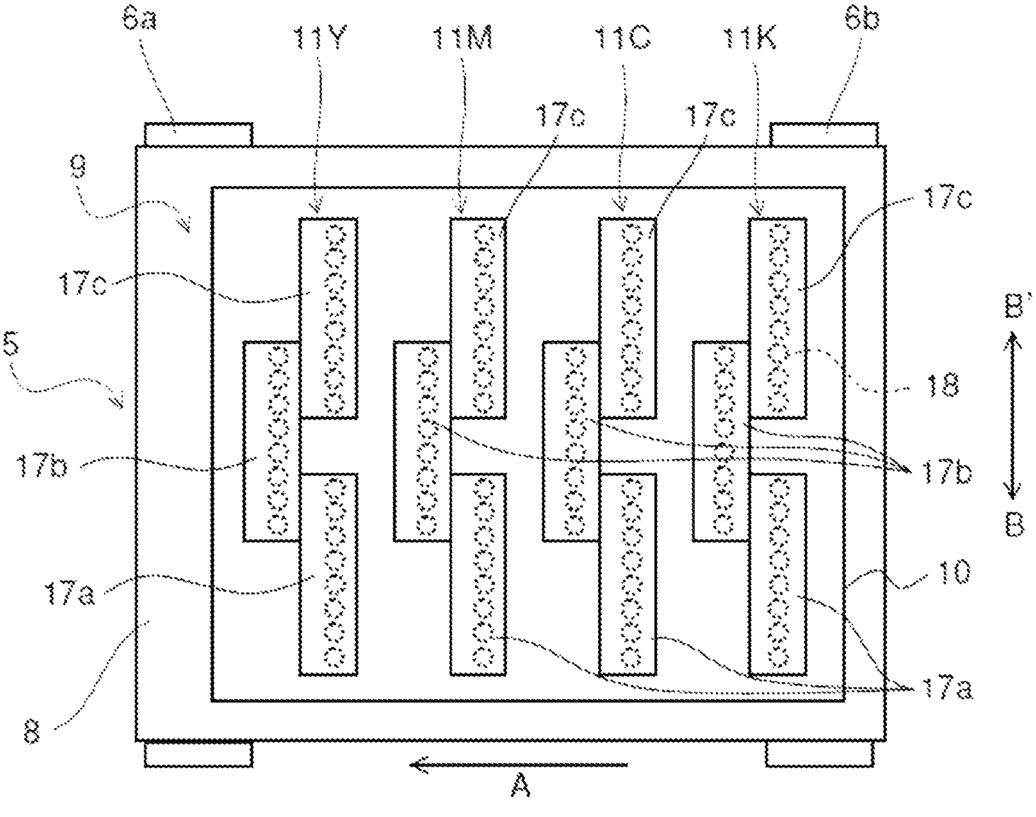
FIG. 2 is a plan view of a recording unit provided to the printer.

FIG. 2 is a plan view of the recording unit 9. The recording unit 9 includes a head housing 10 and line heads 11Y, 11M, 11C, and 11K. The line heads 11Y to 11K are held by the head housing 10 at a height such that a predetermined space (e.g. 1 mm) is formed between each head and a conveying surface of a first conveyor belt 8, which is an endless belt stretched around a plurality of rollers including a drive roller 6*a*, a driven roller 6*b*, and tension rollers 7*a* and 7*b* (see FIG. 7). The drive roller 6*a* drives the first conveyor belt 8 to move in the conveying direction of the paper sheet P (in the arrow A direction). The drive of the drive roller 6*a* is controlled by a main control unit 110*a* (see FIG. 8) of the control device 110. Note that the plurality of rollers are disposed in order of the tension roller 7*a*, the tension roller 7*b*, the driven roller 6*b*, and the drive roller 6*a* along the moving direction of the first conveyor belt 8 (see FIG. 7).

Each of the line heads 11Y to 11K includes a plurality of (e.g. three) recording heads 17*a* to 17*c*. The recording heads 17*a* to 17*c* are arranged in zigzag along a sheet width direction (arrow BB' direction) perpendicular to the sheet conveying direction (arrow A direction). Each of the recording heads 17*a* to 17*c* has a plurality of ink ejection ports 18 (nozzles). The ink ejection ports 18 are aligned in a width direction of the recording head 17*a* to 17*c*, i.e. in the sheet width direction (arrow BB' direction) with equal spaces. The line heads 11Y to 11K eject yellow (Y), magenta (M), cyan (C), and black (K) color inks, respectively, through the ink ejection ports 18 of the recording heads 17*a* to 17*c*, to the paper sheet P conveyed by the first conveyor belt 8.

Figure 3:
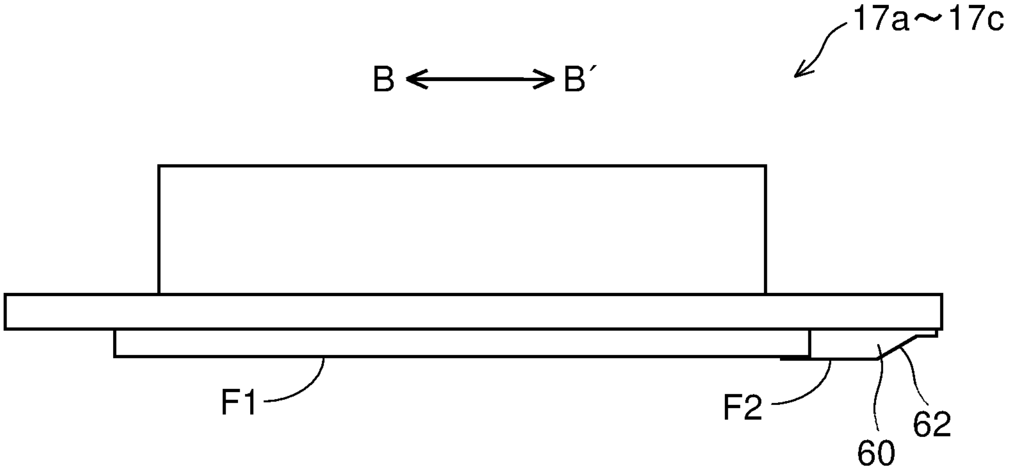
FIG. 3 is a side view of a recording head constituting a line head of the recording unit.
Figure 4:
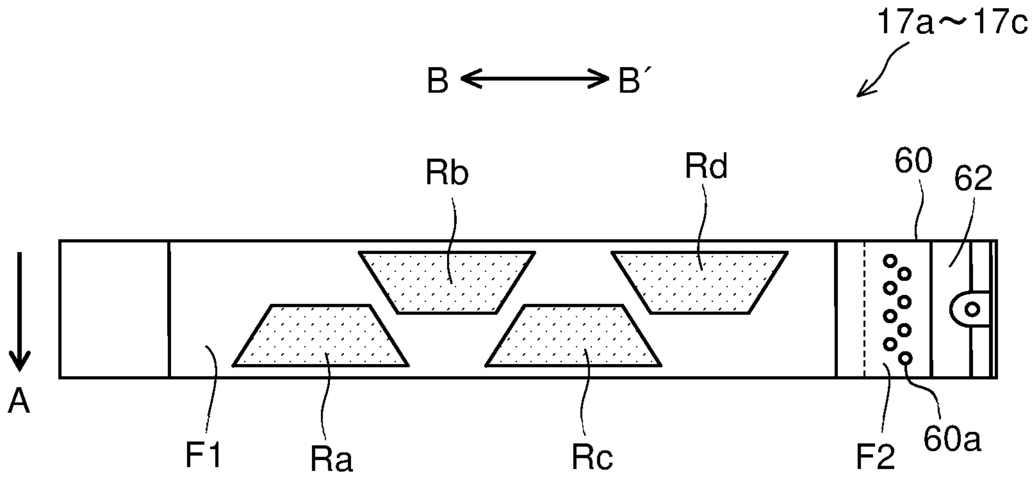
FIG. 4 is a plan view of the recording head viewed from an ink ejecting surface side.
Figure 5:
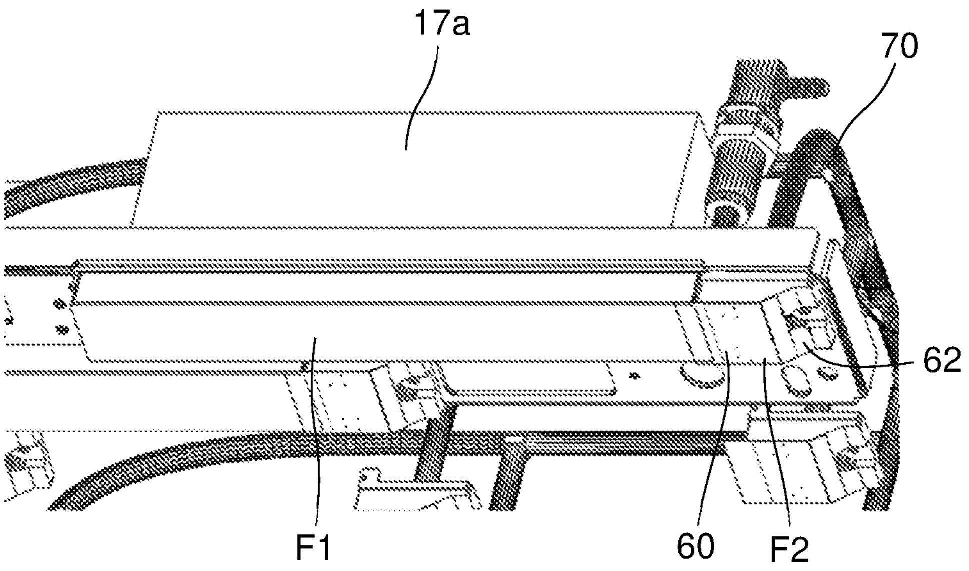
FIG. 5 is a perspective view of the recording head and its vicinity viewed from diagonally below.
Figure 6:
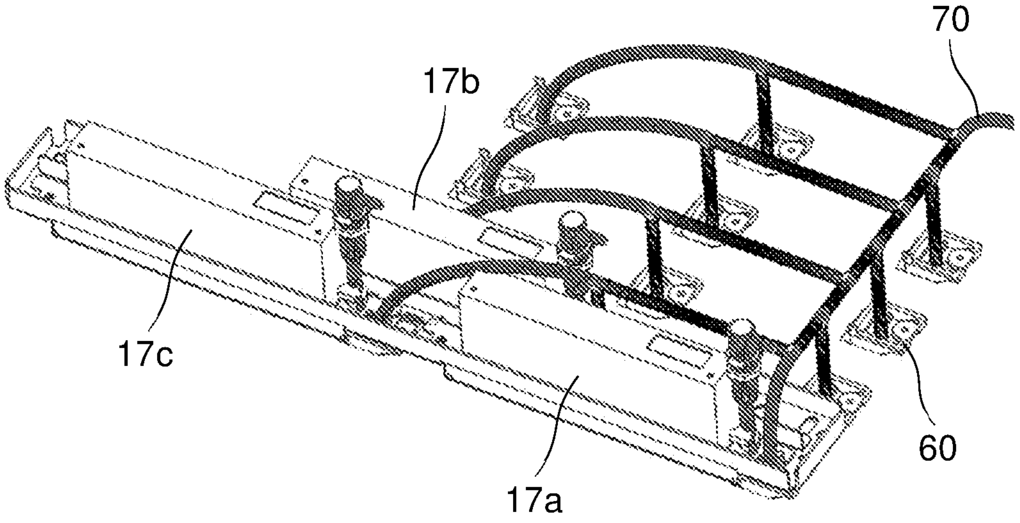
FIG. 6 is a perspective view of the recording head and its vicinity viewed from diagonally above.

FIG. 3 is a side view of the recording head 17*a* to 17*c* constituting the line heads 11Y to 11K of the recording unit 9, FIG. 4 is a plan view of the recording head 17*a* to 17*c* viewed from the ink ejecting surface F1 side, FIG. 5 is a perspective view of the recording head 17*a* and its vicinity viewed from diagonally below, and FIG. 6 is a perspective view of the recording head 17*a* and its vicinity viewed from diagonally above. Note that the recording heads 17*a* to 17*c* have the same shape and structure, and hence the recording heads 17*a* to 17*c* are illustrated with reference to one diagram in FIGS. 3 and 4. As illustrated in FIGS. 3 and 4, the ink ejecting surface (nozzle surface) F1 of the recording head 17*a* to 17*c* is provided with a plurality of (e.g. four blocks of) nozzle areas Ra to Rd, in each of which many ink ejection ports 18 (see FIG. 2) are arranged. The ink ejecting surface F1 is made of stainless steel (SUS), for example.

The recording heads 17*a* to 17*c* constituting each of the line heads 11Y to 11K are supplied with one of four color (yellow, magenta, cyan, and black) inks stored in ink tanks (not shown), corresponding to the color of the line head 11Y to 11K.

Each of the recording heads 17*a* to 17*c* ejects ink from the ink ejection port 18 to the paper sheet P sucked and held to be conveyed on the conveying surface of the first conveyor belt 8, by a control signal from the control device 110 (see FIG. 8), in accordance with image data received from an external computer. In this way, a color image with yellow, magenta, cyan, and black color inks superimposed is formed on the paper sheet P on the first conveyor belt 8. In addition, a cleaning liquid supplying unit 60 for supplying cleaning liquid is disposed at one end part of the recording head 17*a* to 17*c* in a longitudinal direction (arrow BB' direction), which is perpendicular to the sheet conveying direction (arrow A direction). The cleaning liquid supplying unit 60 is provided with many cleaning liquid supply ports 60*a*.

As illustrated in FIGS. 5 and 6, the cleaning liquid supplying unit 60 is connected to a downstream end of a supply passage 70 made of a tube for the cleaning liquid to pass through. An upstream end of the supply passage 70 is connected to a cleaning liquid supply mechanism (not shown). The cleaning liquid supply mechanism is constituted of a tank (not shown) for storing the cleaning liquid and a pumping up pump (not shown) for pumping up the cleaning liquid from the tank to the supply passage 70.

The upstream end of the supply passage 70 is constituted of one passage, and it branches repeatedly toward the downstream side into twelve passages. The twelve passages are connected to the cleaning liquid supplying units 60 of the recording heads 17*a* to 17*c*, respectively, which constitute each of the line heads 11Y to 11K.

In the printer 100, in order to clean the ink ejecting surface F1 of the recording heads 17*a* to 17*c*, a recovery operation of the recording heads 17*a* to 17*c* is performed when starting printing after a long-term suspension and between printing operations, so as to prepare for next printing operation. In the recovery operation of the recording heads 17*a* to 17*c*, ink is pushed out (purged) from the ink ejection port 18 of every recording head 17*a* to 17*c*, cleaning liquid is supplied from the cleaning liquid supply port 60*a* to a cleaning liquid supply surface F2, and a wiper (not shown) wipes the ink pushed out to the ink ejecting surface F1 together with the cleaning liquid. The ink and the cleaning liquid wiped from the ink ejecting surface F1 are collected by ink receivers 31Y to 31K (see FIG. 7) that will be described later.

Figure 7:
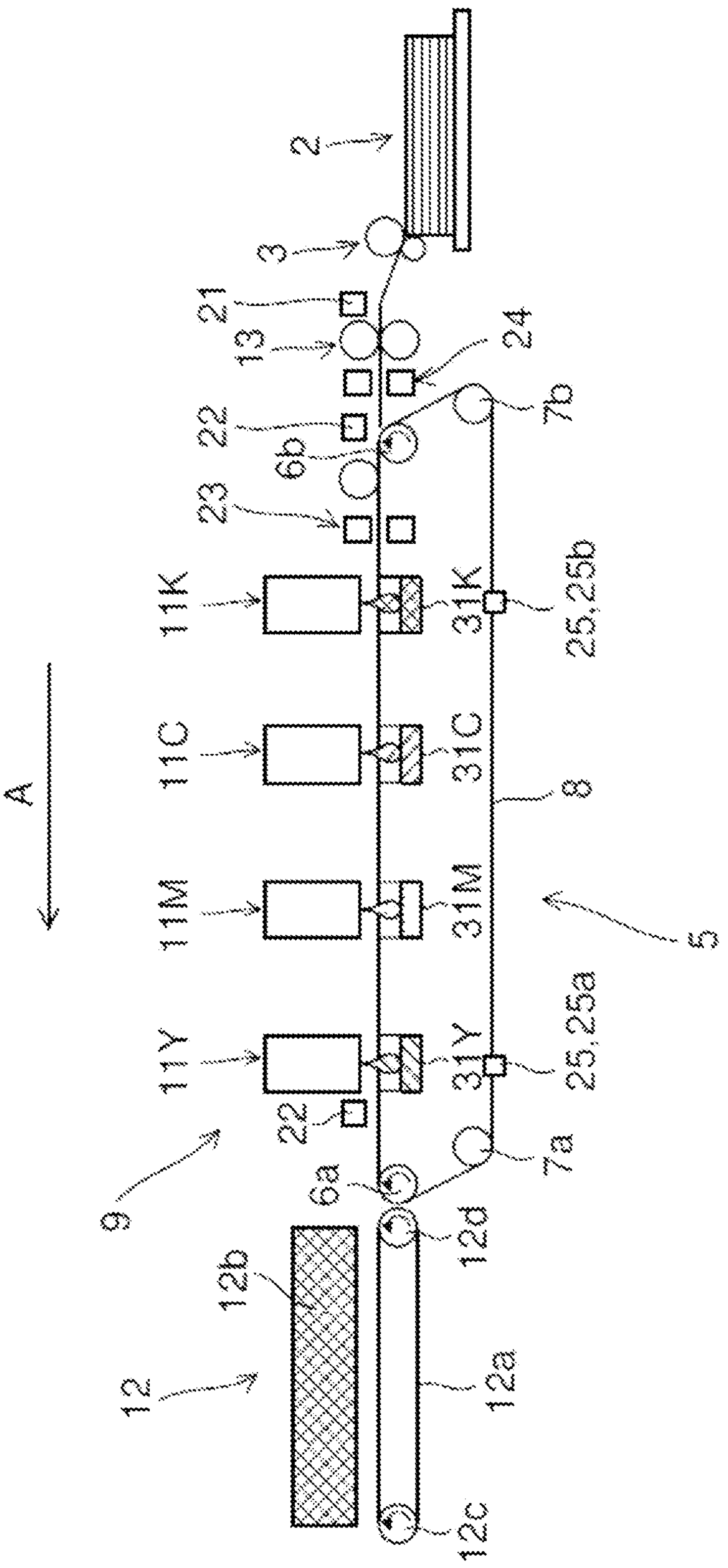
FIG. 7 is an explanatory diagram schematically illustrating a structure of a sheet conveying path and its vicinity, extending from a sheet feed cassette to a second conveying unit through a first conveying unit in the printer.
Figure 8:
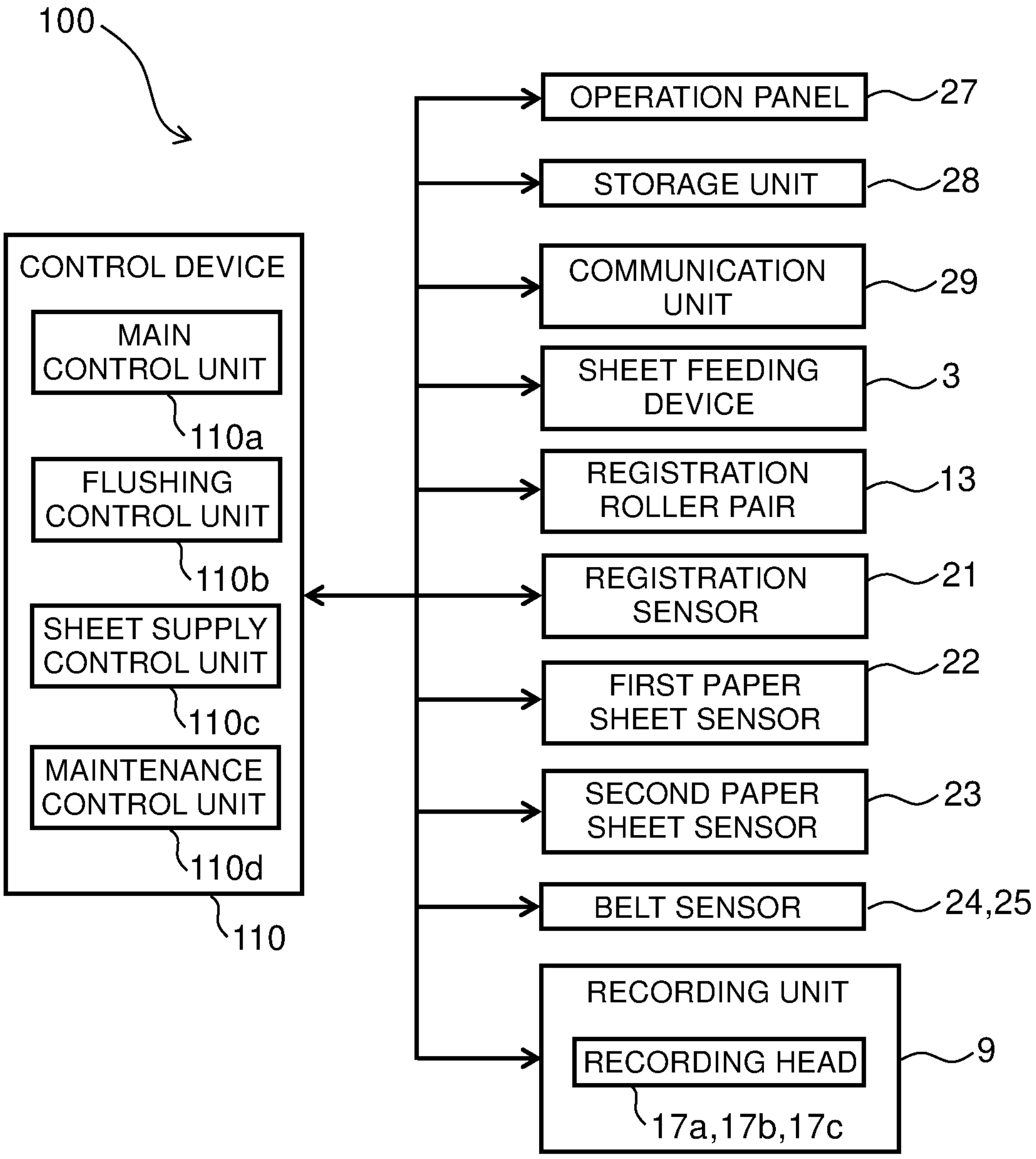
FIG. 8 is a block diagram illustrating a hardware structure of main portions of the printer.

FIG. 7 schematically illustrates a structure of a conveying path of the paper sheet P and its vicinity, extending from the sheet feed cassette 2 to the second conveying unit 12 through the first conveying unit 5. In addition, FIG. 8 is a block diagram illustrating a hardware structure of main portions of the printer 100. In addition to the structure described above, the printer 100 further includes a registration sensor 21, a first paper sheet sensor 22, a second paper sheet sensor 23, and belt sensors 24 and 25.

The registration sensor 21 detects the paper sheet P that is conveyed by the sheet feeding device 3 from the paper sheet cassette 2 to the registration roller pair 13. The registration sensor 21 is positioned on the upstream side of the registration roller pair 13 in a supply direction of the paper sheet P. The control device 110 (e.g. a sheet supply control unit 110*c*) controls timing of starting rotation of the registration roller pair 13 on the basis of a detection result of the registration sensor 21. For instance, the control device 110 controls supply timing of the paper sheet P after skew correction by the registration roller pair 13 to the first conveyor belt 8, on the basis of the detection result of the registration sensor 21.

The first paper sheet sensor 22 detects position in the width direction of the paper sheet P sent from the registration roller pair 13 to the first conveyor belt 8. On the basis of a detection result of the first paper sheet sensor 22, the control device 110 (e.g. the main control unit 110*a*) allows the ink ejection ports 18 corresponding to the width of the paper sheet P among the ink ejection ports 18 of the recording heads 17*a* to 17*c* of the line heads 11Y to 11K to eject ink so as to form an image on the paper sheet P.

The second paper sheet sensor 23 detects passing of the paper sheet P supplied to the first conveyor belt 8 by the registration roller pair 13. In other words, the second paper sheet sensor 23 detects a position in the conveying direction of the paper sheet P conveyed by the first conveyor belt 8. The second paper sheet sensor 23 is positioned on the upstream side of the recording unit 9 and on the downstream side of the first paper sheet sensor 22 in the sheet conveying direction. On the basis of a detection result of the second paper sheet sensor 23, the control device 110 (e.g. the main control unit 110*a*) can control ink ejection timing with respect to the paper sheet P, which is conveyed by the first conveyor belt 8 to reach the position facing the line heads 11Y to 11K (the recording heads 17*a* to 17*c*).

The belt sensors 24 and 25 are reference detection sensors that detect a reference identification part Mref (see FIG. 9) provided to the first conveyor belt 8. The reference identification part Mref is a part that indicates a reference of one turn of the first conveyor belt 8, and is constituted of a combination of two neighboring aperture groups 82 as described later. As described later, a positional relationship between the reference identification part Mref and other apertures 80 (aperture groups 82) is known in advance. Therefore, as the belt sensors 24 and 25 detect the reference identification part Mref of the first conveyor belt 8, positions of the apertures 80 (aperture groups 82) provided to the first conveyor belt 8 in the conveying direction can be detected on the basis of position of the detected reference identification part Mref. Therefore, it can be said that the belt sensors 24 and 25 function as an aperture position detection unit that detects positions of the apertures 80 of the first conveyor belt 8.

Note that it may be possible to form marks at positions corresponding to the aperture groups 82 at an end part in the belt width direction of the first conveyor belt 8, so that the belt sensors 24 and 25 detect the marks, thereby positions of the aperture groups 82 (apertures 80) corresponding to the marks are detected.

The belt sensor 24 is disposed on the downstream side of the recording unit 9 in the sheet conveying direction (moving direction of the first conveyor belt 8). The belt sensor 25 is positioned on the upstream side of the driven roller 6*b* that stretches the first conveyor belt 8, in the sheet conveying direction. In this embodiment, the belt sensor 25 is disposed between the driven roller 6*b* and the tension roller 7*b*, but it may be disposed between the tension rollers 7*a* and 7*b*. The driven roller 6*b* is disposed on the upstream side of the recording unit 9 in the moving direction of the first conveyor belt 8. Note that the belt sensor 24 has the same function as the second paper sheet sensor 23. On the basis of the detection result of the belt sensor 24 or 25, the control device 110 (e.g. the sheet supply control unit 110*c*) can control the registration roller pair 13 so that the paper sheet P is supplied to the first conveyor belt 8 at a predetermined timing.

In addition, position of the paper sheet P is detected by the plurality of sensors (the second paper sheet sensor 23 and the belt sensor 24), while the reference identification part Mref of the first conveyor belt 8 is detected by the plurality of sensors (the belt sensors 24 and 25), and hence error correction of a detected position or abnormality detection can be performed.

The first paper sheet sensor 22, the second paper sheet sensor 23, and the belt sensors 24 and 25 described above may be constituted of a transmission type or reflection type optical sensor, a contact image sensor (CIS), or the like.

Other than that, the printer 100 may include a meandering detection sensor for detecting meandering of the first conveyor belt 8, and may correct meandering of the first conveyor belt 8 on the basis of a detection result thereof.

In addition, the printer 100 further includes an operation panel 27, a storage unit 28, and a communication unit 29.

The operation panel 27 is an operation unit for receiving various setting inputs. For instance, by operating the operation panel 27, a user can input information of size of the paper sheet P set in the sheet feed cassette 2, i.e., size of the paper sheet P conveyed by the first conveyor belt 8. In addition, by operating the operation panel 27, the user can input the number of the paper sheets P to be printed, or can instruct to start a print job. In addition, the operation panel 27 also has a function as a notification device to notify about operating status of the printer 100 (image recording or flushing described later).

The storage unit 28 is a memory for storing an operating program of the control device 110 and various information, and is configured to include a read only memory (ROM), a random access memory (RAM), a nonvolatile memory, and the like. The information set by the operation panel 27 (e.g. information of size of the paper sheet P or the number of the paper sheets P) is stored in the storage unit 28.

The communication unit 29 is a communication interface for sending and receiving information from and to an external device (e.g. a personal computer (PC)). For instance, when the user operates the PC to send the image data and a print command to the printer 100, the image data and the print command are input to the printer 100 via the communication unit 29. As the main control unit 110*a* controls the recording heads 17*a* to 17*c* to eject ink on the basis of the image data, the printer 100 can record the image on the paper sheet P.

In addition, the printer 100 of this embodiment includes the control device 110. The control device 110 is configured to include a central processing unit (CPU) and a memory, for example. Specifically, the control device 110 includes the main control unit 110*a*, a flushing control unit 110*b*, the sheet supply control unit 110*c*, and a maintenance control unit 110*d*. The individual control units included in the control device 110 are constituted of a single CPU, but they may be constituted of separate CPUs.

The main control unit 110*a* controls operations of individual portions of the printer 100. For instance, the main control unit 110*a* controls drive of the rollers in the printer 100, ink ejection from the recording heads 17*a* to 17*c* during image formation (other than flushing), and the like.

The flushing control unit 110*b* controls the recording heads 17*a* to 17*c* to perform flushing on the basis of the position detection of the apertures 80 by the belt sensor 24 or 25. Note that details of flushing based on position detection of the apertures 80 will be described later.

The sheet supply control unit 110*c* is a recording medium supply control unit that controls the registration roller pair 13 as a recording medium supplying unit. For instance, the sheet supply control unit 110*c* controls the registration roller pair 13 on the basis of the position detection of the apertures 80 by the belt sensor 24 or 25. Note that the sheet supply control unit 110*c* can also control the registration roller pair 13 independently of the position detection (without any relation to the position detection) of the apertures 80 by the belt sensor 24 or 25.

The maintenance control unit 110*d* controls the recording heads 17*a* to 17*c* to perform the purging described above, in which ink is forcedly pushed out from the individual ink ejection ports 18. When the maintenance control unit 110*d* controls the recording heads 17*a* to 17*c* to perform the purging, it also controls drive of the maintenance unit 19 described above (e.g. movement and retreat downward of the recording unit 9).

In addition, as illustrated in FIG. 7, the printer 100 includes ink receivers 31Y, 31M, 31C, and 31K disposed on an inner circumferential surface side of the first conveyor belt 8. When the flushing is performed by the recording heads 17*a* to 17*c*, the ink receivers 31Y to 31K receive and collect ink that is ejected from the recording heads 17*a* to 17*c* and passes the apertures 80 of the first conveyor belt 8. Therefore, the ink receivers 31Y to 31K are disposed at positions opposed to the recording heads 17*a* to 17*c* of the line heads 11Y to 11K, respectively, via the first conveyor belt 8. The ink collected by the ink receivers 31Y to 31K is sent to the waste ink tank (not shown), for example, through an ink discharge flow path 33 (see FIG. 11), and is discarded.

The second conveying unit 12 includes a second conveyor belt 12*a* and a drier 12*b*. The second conveyor belt 12*a* is stretched around two rollers, i.e. a drive roller 12*c* and a driven roller 12*d*. The paper sheet P, on which an image is formed by ink ejection using the recording unit 9 while being conveyed by the first conveying unit 5, is conveyed by the second conveyor belt 12*a* and is dried by the drier 12*b* while being conveyed, and then is conveyed to the decurler unit 14 described above.

[2. Detail of First Conveyor Belt]

Figure 9:
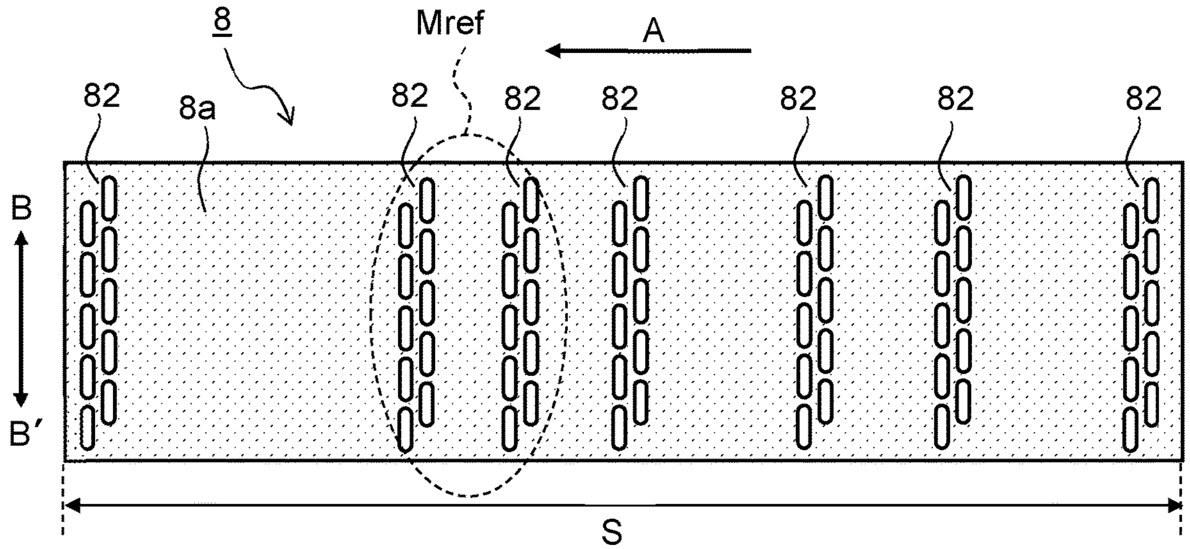
FIG. 9 is a plan view of one structural example of a first conveyor belt of the first conveying unit.
Figure 10:
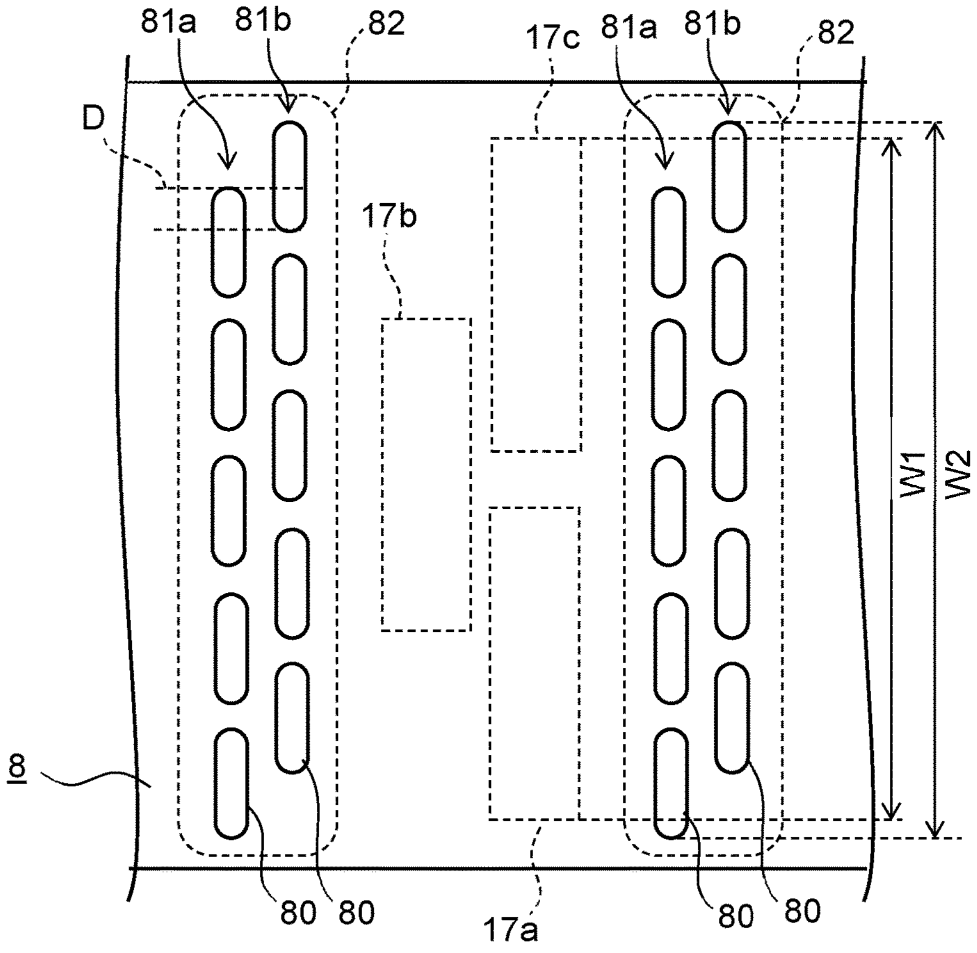
FIG. 10 is a partial enlarged view of apertures and their vicinity of the first conveyor belt illustrated in FIG. 9.

Next, detail of the first conveyor belt 8 of the first conveying unit 5 is described. FIG. 9 is a plan view illustrating a structural example of the first conveyor belt 8 used in the printer 100. FIG. 10 is a partial enlarged view of a second aperture 85 and its vicinity of the first conveyor belt 8 illustrated in FIG. 9.

In this embodiment, a negative pressure suction method is adopted, in which the paper sheet P is sucked on the first conveyor belt 8 by negative pressure suction and is conveyed. Therefore, the entire area of the first conveyor belt 8 is provided with many suction holes 8*a*, through which suction air passes for sucking the paper sheet P on the first conveyor belt 8 by negative pressure suction.

The first conveyor belt 8 has the plurality of apertures 80, through which the ink ejected from the nozzles (the ink ejection ports 18) of the recording heads 17*a* to 17*c* passes during the flushing operation. Each aperture 80 is a long hole elongated in the belt width direction (arrow BB' direction). The plan view shape of the aperture 80 is a long hole, i.e. a round cornered rectangle as illustrated in FIG. 9 in this embodiment, but it may be a rectangle or other shapes (such as an elliptical shape).

In this embodiment, a plurality of (e.g. six in one period S of the first conveyor belt 8) aperture groups 82, each of which includes the plurality of apertures 80, are arranged in the sheet conveying direction (arrow A direction) with predetermined spaces. Each aperture group 82 has two aperture rows 81*a* and 81*b*. The space between the aperture groups 82 in the conveying direction is not the same but is irregular so that the aperture groups 82 are formed at positions corresponding to a size of the paper sheet P to be conveyed. In other words, in the sheet conveying direction, the space between the neighboring aperture groups 82 is not constant but varied. In this case, the maximum space between the neighboring aperture groups 82 in the sheet conveying direction is longer than the length of the paper sheet P in the sheet conveying direction when a printable minimum size of paper sheet P (e.g. laterally placed A4 size) is placed on the first conveyor belt 8.

Each of the aperture rows 81*a* and 81*b* has a plurality of (e.g. five) aperture 80*s* aligned in the belt width direction (arrow BB' direction) with equal spaces. Each aperture 80 of one aperture row 81*a* is disposed to have a part (a longitudinal direction end part) that overlaps with the aperture 80 of the other aperture row 81*b* (to have an overlapping part D) in the belt width direction, viewed from the conveying direction of the paper sheet P (arrow A direction). In other words, in the first conveyor belt 8, the plurality of apertures 80 are arranged in a zig-zag manner. Note that the number of the apertures 80 may be different between one aperture row 81*a* and the other aperture row 81*b*.

Here, when the line head 11Y to 11K (recording head 17*a* to 17*c*) has a head width of W1 (mm), the aperture group 82 has a belt width direction width W2 (mm) that is larger than W1. As a result, when the recording head 17*a* to 17*c* performs flushing, ink ejected from each ink ejection port 18 of the recording head 17*a* to 17*c* passes through each aperture 80 of one of the aperture row 81*a* and the aperture row 81*b*. Therefore, it is possible to allow the recording heads 17*a* to 17*c* to perform flushing over the entire head width, so as to reduce clogging due to ink drying in every ink ejection port 18.

In this embodiment, the control device 110 (e.g. the flushing control unit 110*b*) determines a pattern (combination) in the sheet conveying direction of the aperture groups 82 to be used for flushing, during one period S of the first conveyor belt 8, in accordance with the size of the paper sheet P to be used. More specifically, the belt sensor 24 or 25 reads the reference identification part Mref of the first conveyor belt 8, and on the basis of position information of the reference identification part Mref and size information of the paper sheet P, the timing of conveying the paper sheet P from the registration roller pair 13 to the first conveyor belt 8 is changed. In this way, it is controlled so that the aperture groups 82 are positioned with a constant period between the paper sheets P that are successively conveyed.

The control device 110 can recognize the size of the paper sheet P to be used, on the basis of information stored in the storage unit 28 (e.g. the size information of the paper sheet P input by the operation panel 27). Note that the timing for performing the flushing is not limited to "between the paper sheets P". For instance, it is possible to perform the flushing before forming an image on the first paper sheet P or after forming an image on the last paper sheet P.

[3. Structure of Ink Receiver of First Embodiment]

Figure 11:
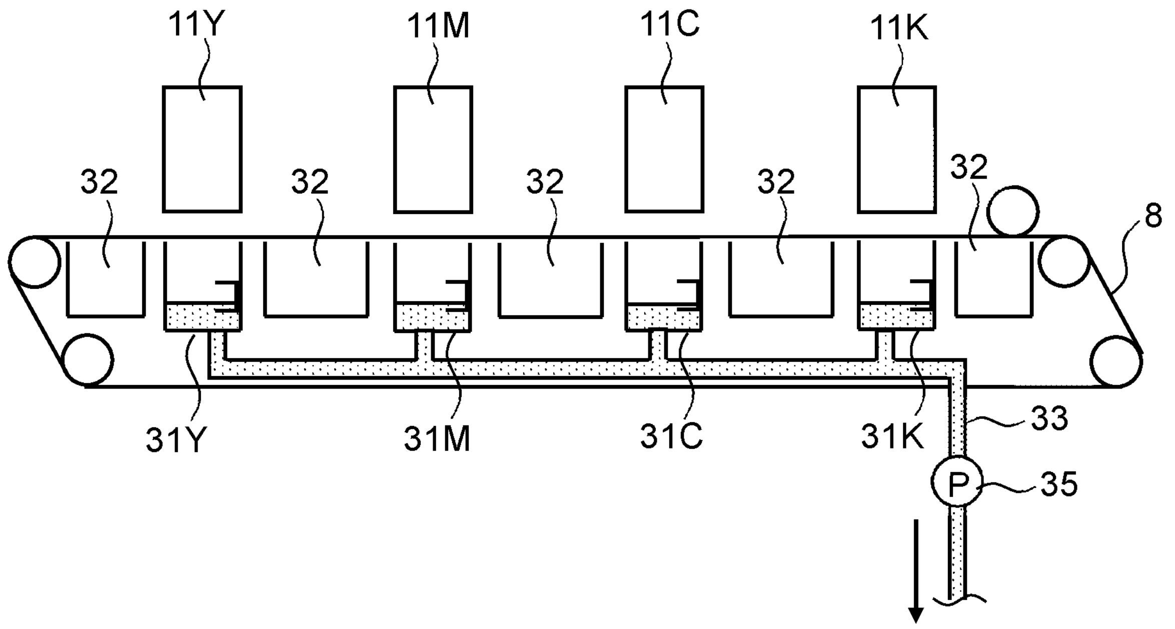
FIG. 11 is a schematic diagram illustrating an ink discharge path including ink receivers in the printer according to a first embodiment of the present disclosure.
Figure 12:
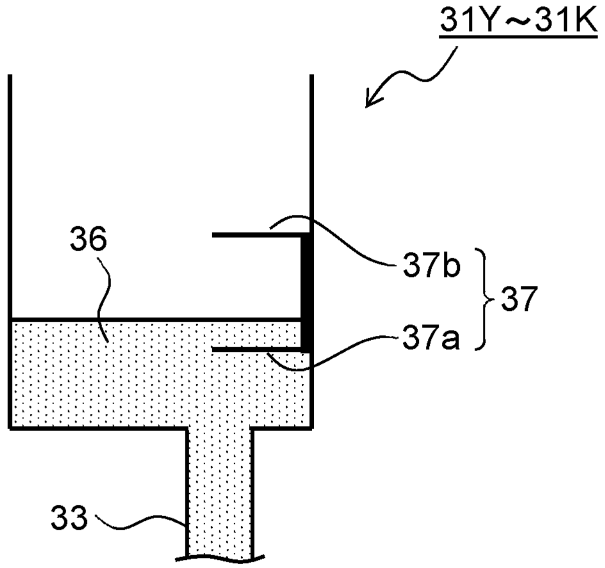
FIG. 12 is a cross-sectional side view illustrating the ink receiver used in the printer of the first embodiment.

Next, the ink receivers 31Y to 31K in the printer 100 of the present disclosure are described. FIG. 11 is a schematic diagram illustrating an ink discharge path including the ink receivers 31Y to 31K in the printer 100, according to a first embodiment of the present disclosure. FIG. 12 is a cross-sectional side view illustrating a structure of the ink receivers 31Y to 31K used in the printer 100 of the first embodiment. Note that the ink receivers 31Y to 31K have the same structure, and hence they are described with reference to one diagram.

The ink receivers 31Y to 31K are disposed right below the line heads 11Y to 11K, respectively, sandwiching the first conveyor belt 8 therebetween. In addition, a plurality of (e.g. five) suction units 32, which suck and hold the paper sheet P on the first conveyor belt 8 by negative pressure suction, are disposed along the moving direction of the first conveyor belt 8, in such a manner as to sandwich each of the ink receivers 31Y to 31K.

A pipe-shaped ink discharge flow path 33 is connected to the bottoms of the ink receivers 31Y to 31K. The ink discharge flow path 33 branches to connect to the ink receivers 31Y to 31K, and they join to be one on the downstream side of the ink receiver 31K in an ink discharge direction. The ink discharge flow path 33 is equipped with a pump 35 disposed on the downstream side of the ink receiver 31K.

As illustrated in FIG. 12, liquid 36 is stored inside the ink receiver 31Y to 31K. In this embodiment, the liquid 36 is ink ejected from the recording head 17*a* to 17*c*.

A liquid level detection sensor 37 is disposed on the inner side surface of the ink receiver 31Y to 31K. The liquid level detection sensor 37 includes an earth electrode 37*a* and a detection electrode 37*b* positioned above the earth electrode 37*a*. An AC voltage is applied between the earth electrode 37*a* and the detection electrode 37*b*. Current does not flow in the state of FIG. 11, in which the liquid 36 does not fill between the earth electrode 37*a* and the detection electrode 37*b*. When the liquid level of the liquid 36 rises and reaches the detection electrode 37*b*, current flows between the earth electrode 37*a* and the detection electrode 37*b*. This current is detected so as to detect the liquid level of the liquid 36, and a storage amount of the liquid 36 is controlled on the basis of a detection result.

Next, control of ink discharge from the ink receivers 31Y to 31K in the printer 100 of this embodiment is described. First, before image recording is started (before the paper sheet P reaches the line heads 11Y to 11K), a predetermined amount of liquid 36 is stored in the ink receivers 31Y to 31K in advance. Specifically, in the state where the first conveyor belt 8 is stopped, the recording heads 17*a* to 17*c* eject ink to the ink receivers 31Y to 31K through the apertures 80 a predetermined number of times, so that a predetermined amount of ink is stored.

When the communication unit 29 receives the print command, the main control unit 110*a* controls the recording heads 17*a* to 17*c* to record an image on the paper sheet P on the basis of the image data, and the flushing control unit 110*b* performs flushing between the paper sheets P. Ink drops are ejected to the liquid 36 stored in the ink receivers 31Y to 31K and are stored together with the liquid 36. The storage amount of the liquid 36 in the ink receiver 31Y to 31K is detected by the liquid level detection sensor 37.

Specifically, when current starts to follow in the liquid level detection sensor 37, it is determined that the liquid level has exceeded a predetermined height (that the storage amount of the liquid 36 has exceeded a predetermined amount), the flushing is stopped, and the pump 35 is activated so as to discharge the liquid 36 to the ink discharge flow path 33. Further, the current flowing in the liquid level detection sensor 37 stops, it is determined that the liquid level has become lower than or equal to the predetermined height (that the storage amount of the liquid 36 has become less than or equal to the predetermined amount), the pump 35 is stopped, and the flushing is restarted.

After that, in the same manner, output of the liquid level detection sensor 37 is detected every time when the flushing is performed, and the pump 35 is driven only when current flows. After that, at timing when image recording is finished, the pump 35 is driven continuously for a predetermined period of time so as to discharge all liquid 36 in the ink receivers 31Y to 31K. To discharge all liquid 36 in the ink receivers 31Y to 31K means to discharge all dischargable liquid 36 out of the liquid 36 in the ink receivers 31Y to 31K, by driving the pump 35. The driving period of time of the pump 35 is set to a sufficient period of time for discharging the liquid 36.

According to this embodiment, a predetermined amount of liquid 36 is stored in the ink receivers 31Y to 31K before starting image recording, and hence the ink drops ejected to the ink receivers 31Y to 31K by flushing are prevented from drying and lowering flowability, so that ink collecting efficiency can be improved. Therefore, it is possible to prevent the first conveyor belt 8 and the paper sheet P from being stained or the ink discharge flow path 33 from clogging, due to accumulation of ink having low flowability on the ink receivers 31Y to 31K.

The liquid 36 stored in the ink receivers 31Y to 31K is not limited to the ink as long as it can dissolve the ink drops. For instance, it may be possible to store the cleaning liquid as the liquid 36, which is supplied to the ink ejecting surface F1 during the recovery operation of the recording heads 17*a* to 17*c*. The cleaning liquid contains water, deliquescence agent, organic solvent, surfactant, basic compound, polyhydric alcohol, and the like, so as to enhance ink dissolving ability.

As a method of storing the cleaning liquid in the ink receivers 31Y to 31K, it may be possible to form apertures in the first conveyor belt 8, through which the cleaning liquid passes, at positions opposed to the cleaning liquid supplying units 60, and to eject the cleaning liquid from the cleaning liquid supplying unit 60 to the ink receivers 31Y to 31K through the apertures.

[4. Structure of Ink Receiver of Second Embodiment]

Figure 13:
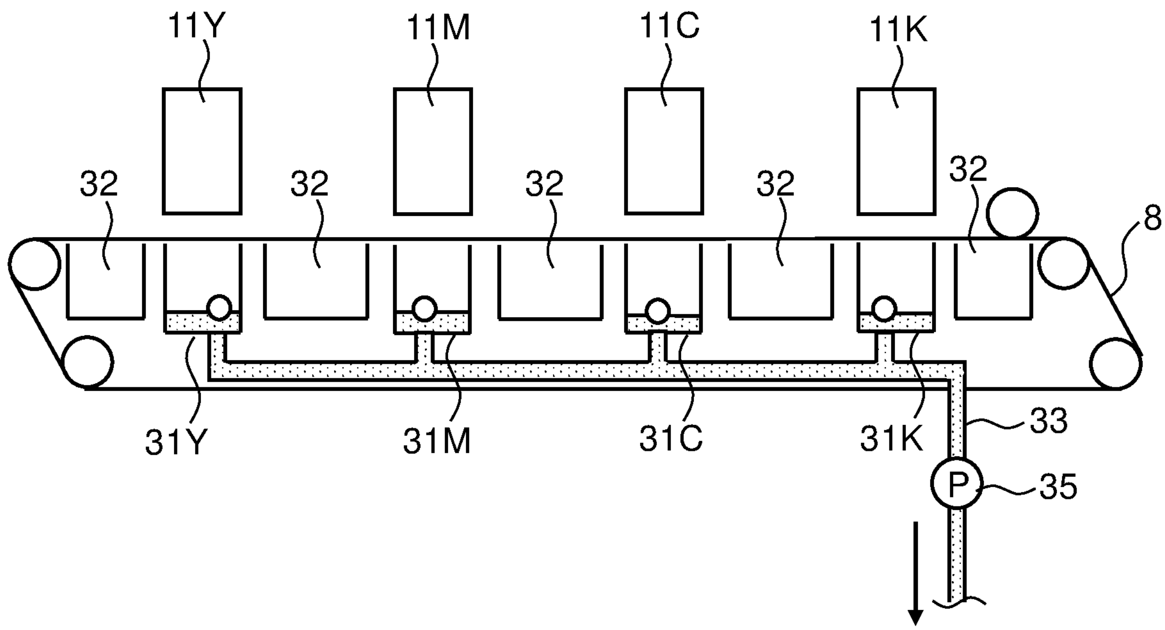
FIG. 13 is a schematic diagram illustrating the ink discharge path including the ink receivers in the printer according to a second embodiment of the present disclosure.
Figure 14:
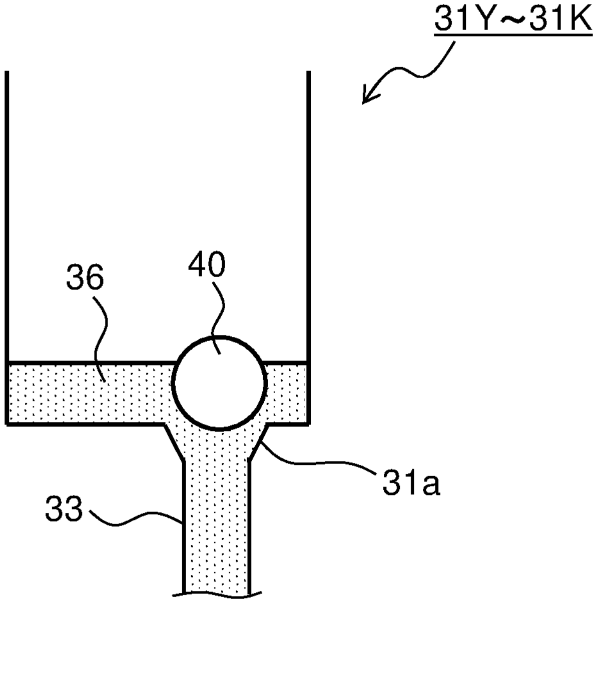
FIG. 14 is a cross-sectional side view illustrating a structure of the ink receiver used in the printer of the second embodiment, and is a diagram showing a state where liquid in the ink receiver is more than a predetermined amount.

FIG. 13 is a schematic diagram illustrating the ink discharge path including the ink receivers 31Y to 31K in the printer 100 of a second embodiment of the present disclosure. FIG. 14 is a cross-sectional side view illustrating a structure of the ink receiver 31Y to 31K used in the printer 100 of the second embodiment. Note that the ink receivers 31Y to 31K have the same structure, and hence they are described with reference to one diagram.

As illustrated in FIGS. 13 and 14, the ink receiver 31Y to 31K does not have the liquid level detection sensor 37 inside, but has a spherical float member 40. In addition, the bottom of the ink receiver 31Y to 31K is provided with a connection part 31*a* to which the ink discharge flow path 33 is connected. The structure of other parts of the ink discharge path including the ink receiver 31Y to 31K is the same as in the first embodiment.

The float member 40 is made of a material having a smaller specific gravity than the liquid 36 stored in the ink receiver 31Y to 31K. The connection part 31*a* has a tapered shape whose diameter is decreasing from the upstream side to the downstream side in the discharge direction of the liquid 36 (from up to down in FIG. 9). An inner diameter of a boundary part (large diameter part) between the connection part 31*a* and the bottom of the ink receiver 31Y to 31K is larger than a diameter of the float member 40, while an inner diameter of a boundary part between the connection part 31*a* and the ink discharge flow path 33 is smaller than the diameter of the float member 40.

FIG. 14 illustrates a state where the liquid 36 in the ink receiver 31Y to 31K is more than the predetermined amount, and the float member 40 is floating on the liquid 36. In this state, the ink receiver 31Y to 31K communicates with the ink discharge flow path 33, and the liquid 36 in the ink receiver 31Y to 31K can be discharged by driving the pump 35.

Figure 15:
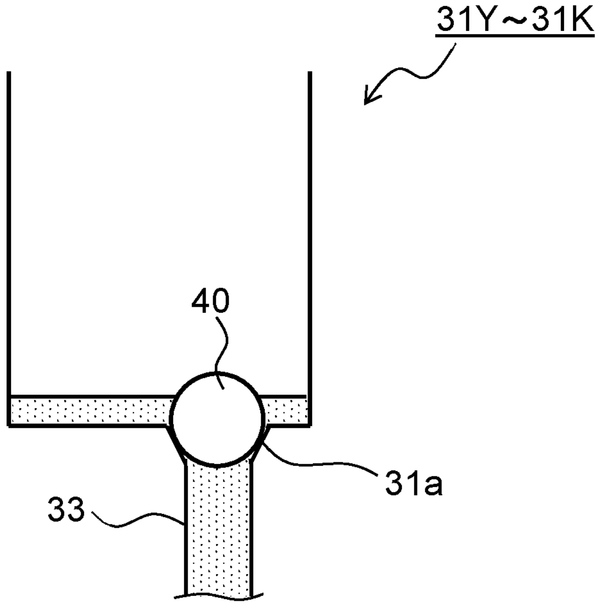
FIG. 15 is a cross-sectional side view illustrating the structure of the ink receiver used in the printer of the second embodiment, and is a diagram showing a state where liquid in the ink receiver is decreased to the predetermined amount.

FIG. 15 is a diagram illustrating a state where the liquid 36 in the ink receiver 31Y to 31K is discharged from the state of FIG. 14, and the liquid 36 is reduced to the predetermined amount. When the liquid 36 in the ink receiver 31Y to 31K becomes less than or equal to the predetermined amount, the float member 40 abuts the connection part 31*a* of the ink receiver 31Y to 31K so as to close the ink discharge flow path 33. In this way, the storage amount of the liquid 36 in the ink receiver 31Y to 31K can be maintained to be always the predetermined amount or more.

Next, control for discharging ink from the ink receiver 31Y to 31K in the printer 100 of this embodiment is described. First, before starting the image recording (before the paper sheet P reaches the line heads 11Y to 11K), the predetermined amount of liquid 36 is stored in advance in the ink receivers 31Y to 31K. A method of storing the liquid 36 (e.g. ink) is the same as in the first embodiment.

When the communication unit 29 receives the print command, the main control unit 110*a* controls the recording heads 17*a* to 17*c* to record an image on the paper sheet P on the basis of the image data, and the flushing control unit 110*b* performs the flushing between the paper sheets P. Ink drops are ejected to the liquid 36 stored in the ink receivers 31Y to 31K and are stored together with the liquid 36.

After performing the flushing a predetermined number of times, the pump 35 is activated so as to discharge the liquid 36 to the ink discharge flow path 33. Further, when the float member 40 abuts the connection part 31*a* so that the discharge of the liquid 36 is stopped, the pump 35 is stopped, and the flushing is restarted. After that, in the same manner, the pump 35 is driven every time when the flushing is performed a predetermined number of times, and the pump 35 is stopped when the discharge of the liquid 36 is stopped.

According to this embodiment, in the same manner as in the first embodiment, a predetermined amount of liquid 36 is stored in the ink receivers 31Y to 31K before starting image recording, and hence the ink ejected to the ink receivers 31Y to 31K by flushing are prevented from drying and lowering flowability, so that ink collecting efficiency can be improved. Therefore, it is possible to prevent the paper sheet P from being stained or the ink discharge flow path 33 from clogging, due to accumulation of ink on the ink receivers 31Y to 31K.

In addition, using the float member 40, it is possible to always store a predetermined amount or more of the liquid 36 in the ink receivers 31Y to 31K. Therefore, unlike the first embodiment, it is not necessary to dispose the liquid level detection sensor 37 for controlling the storage amount of the liquid 36 or to control drive of the pump 35, and this contributes to simplification of control of the printer 100 and cost reduction of the same.

Figure 16:
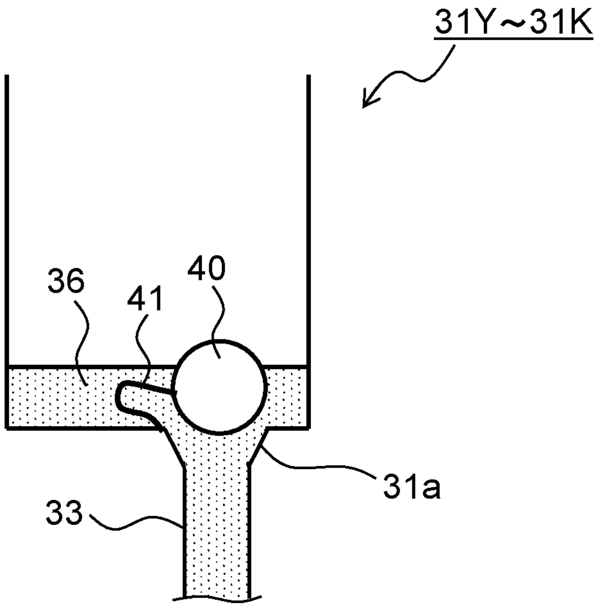
FIG. 16 is a cross-sectional side view illustrating another structural example of the ink receiver used in the printer of the second embodiment.

FIG. 16 is a cross-sectional side view illustrating another structural example of the ink receiver 31Y to 31K of the second embodiment. In the structure illustrated in FIG. 16, the float member 40 is connected to a vicinity of the connection part 31*a* with a string connection member 41. The structure of other parts of the ink receivers 31Y to 31K is the same as in FIGS. 14 and 15.

In the structure illustrated in FIG. 16, the float member 40 cannot move to a position apart from the connection part 31*a* by a predetermined distance or more. Therefore, when the liquid 36 in the ink receiver 31Y to 31K becomes less than or equal to the predetermined amount, the ink discharge flow path 33 can be securely closed using the float member 40.

Figure 17:
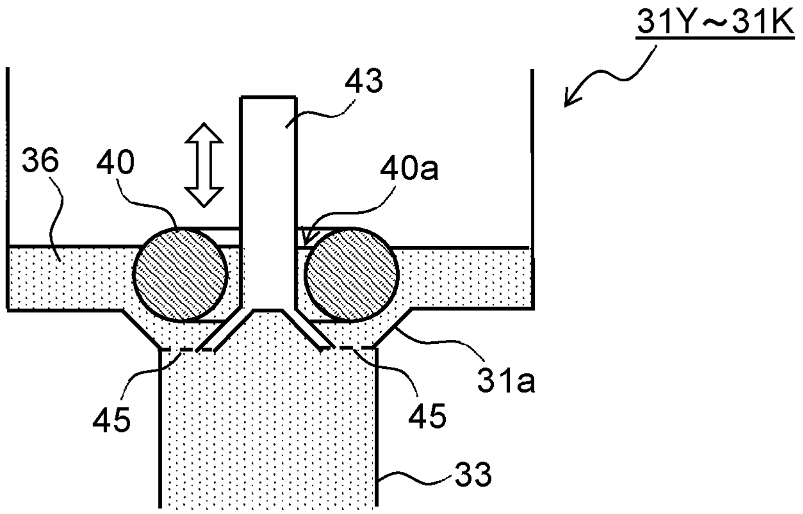
FIG. 17 is a cross-sectional side view illustrating still another structural example of the ink receiver used in the printer of the second embodiment.
Figure 18:
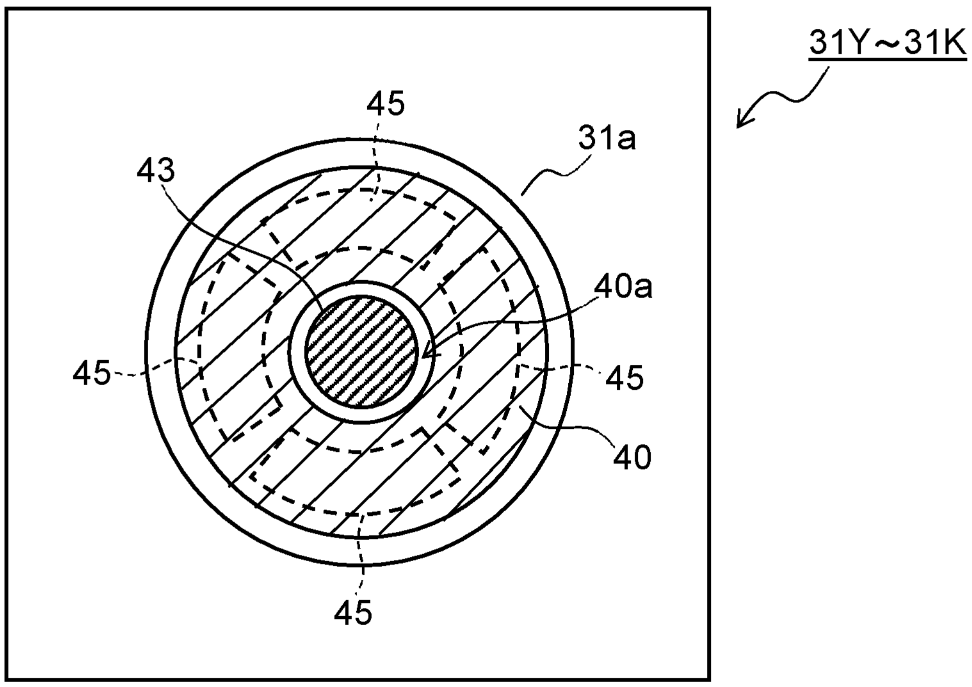
FIG. 18 is a plan view of a connection part of the ink receiver illustrated in FIG. 17.

FIG. 17 is a cross-sectional side view illustrating still another structural example of the ink receiver 31Y to 31K of the second embodiment. FIG. 18 is a plan view of the connection part 31*a* of the ink receiver 31Y to 31K illustrated in FIG. 17, viewed from above. In the structure illustrated in FIGS. 17 and 18, the connection part 31*a* includes a support rod 43 disposed to stand at the center, and a plurality of arcuate waste liquid holes 45 formed around the support rod 43. The float member 40 has a toroidal shape with a center opening 40*a*, in which the support rod 43 is inserted. The structure of other parts of the ink receivers 31Y to 31K is the same as in FIGS. 14 and 15.

In the structure illustrated in FIGS. 17 and 18, when the liquid 36 in the ink receiver 31Y to 31K is increased or decreased, the float member 40 moves up or down along the support rod 43. Therefore, the float member 40 is always positioned above the connection part 31*a*. Therefore, when the liquid 36 in the ink receivers 31Y to 31K becomes less than or equal to the predetermined amount, the ink discharge flow path 33 can be closed more securely than the structure of FIG. 16.

[5. Structure of Ink Receiver of Third Embodiment]

Figure 19:
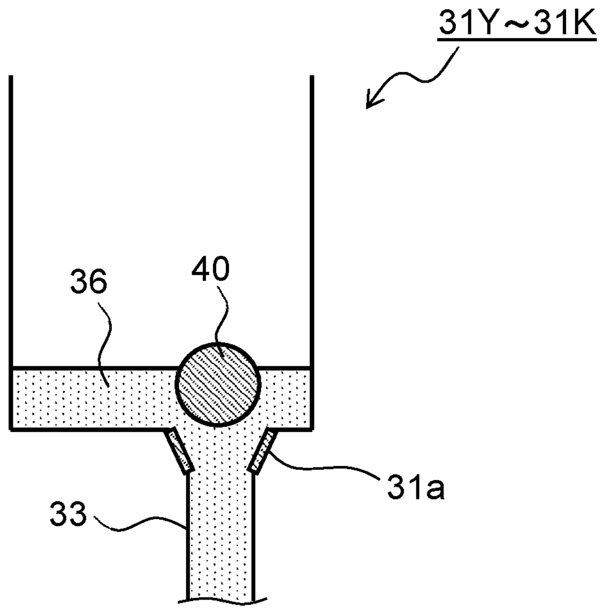
FIG. 19 is a cross-sectional side view illustrating a structure of the ink receiver used in the printer according to a third embodiment of the present disclosure.

FIG. 19 is a cross-sectional side view illustrating a structure of the ink receiver 31Y to 31K used in the printer 100 of the third embodiment. Note that the ink receivers 31Y to 31K have the same structure, and hence they are described with reference to one diagram.

In this embodiment, the float member 40 and the connection part 31*a* of the ink receiver 31Y to 31K that the float member 40 abuts are made of a material having higher water repellency than other parts of the ink receivers 31Y to 31K. The structure of other parts of the ink discharge path including the ink receiver 31Y to 31K is the same as in the second embodiment.

According to this embodiment, as the float member 40 and the connection part 31*a* that the float member 40 abuts have a higher water repellency, when the float member 40 abuts the connection part 31*a* so that the ink discharge flow path 33 is closed, discharge of the liquid 36 through the ink discharge flow path 33 can be completely stopped. As a result, a predetermined amount of liquid 36 can be stored stably in the ink receiver 31Y to 31K.

The material of the float member 40 and the connection part 31*a* of the ink receiver 31Y to 31K that the float member 40 abuts is not limited as long as it is a resin having high water repellency, but it is preferably polytetrafluoroethylene resin (PTFE). As an index of water repellency of the float member 40 and the connection part 31*a*, it is preferred that the water contact angle is 110 degrees or more. Other parts of the ink receiver 31Y to 31K are made of polystyrene (PS), for example.

[6. Others]

The present disclosure is not limited to the embodiments described above, but can be variously modified within the scope of the present disclosure without deviating from the spirit thereof. For instance, the embodiments described above describe the case where the paper sheet P is sucked and conveyed by the first conveyor belt 8 by negative pressure suction using the suction unit 32, but it may be possible to charge the first conveyor belt 8 so that the paper sheet P is electrostatically adsorbed to the first conveyor belt 8 and is conveyed (an electrostatic adsorption type).

In addition, the embodiment described above describes the structure using the first conveyor belt 8 having the aperture groups 82, each of which includes the plurality of apertures 80, arranged irregularly at positions corresponding to the paper sheet size in the sheet conveying direction (arrow A direction), but it may be possible to use the first conveyor belt 8 having the aperture groups 82 arranged with constant spaces in the sheet conveying direction.

In addition, the embodiment described above describes the example of using the color printer as the inkjet recording apparatus, which uses four color inks to record a color image, but the ink discharge path of this embodiment can be used also in a case of using a monochrome printer that uses black ink to record a monochrome image.

The present disclosure can be applied to inkjet recording apparatuses such as an inkjet printer.

What is claimed is:

1. An inkjet recording apparatus comprising:

a recording head including a plurality of nozzles for ejecting ink;

a conveyor belt configured to have a plurality of apertures, and to convey recording media one by one;

a control unit configured to control drive of the recording head and the conveyor belt to perform flushing, in which the ink is ejected from the nozzle of the recording head so as to pass through one of the plurality of apertures, at a timing different from a timing contributing to image recording;

an ink receiver disposed to be opposed to the recording head sandwiching the conveyor belt therebetween, so as to receive the ink after passing through the aperture when the flushing is performed;

an ink discharge flow path connected to the ink receiver, a pump for discharging the liquid in the ink receiver via the ink discharge flow path; and a sensor for detecting a storage amount of the liquid in the ink receiver, when the flushing is performed, a predetermined amount of liquid is stored in the ink receiver, wherein when the storage amount of the liquid in the ink receiver exceeds the predetermined amount during execution of the flushing, the control unit stops the flushing and drives the pump so as to discharge the liquid containing the ink in the ink receiver, and when the storage amount of the liquid in the ink receiver is decreased to the predetermined amount, the control unit stops the drive of the pump and restarts the flushing.

2. The inkjet recording apparatus according to claim 1, wherein the control unit drives the pump continuously for a predetermined period of time so as to discharge all the liquid containing the ink in the ink receiver, at timing when the image recording is finished.

3. The inkjet recording apparatus according to claim 1, wherein the liquid is the ink, and the control unit controls the recording head to eject the ink through the aperture to the ink receiver, so that a predetermined amount of the ink is stored.

4. An inkjet recording apparatus comprising:

a recording head including a plurality of nozzles for ejecting ink;

a conveyor belt configured to have a plurality of apertures, and to convey recording media one by one;

a control unit configured to control drive of the recording head and the conveyor belt to perform flushing, in which the ink is ejected from the nozzle of the recording head so as to pass through one of the plurality of apertures, at a timing different from a timing contributing to image recording;

an ink receiver disposed to be opposed to the recording head sandwiching the conveyor belt therebetween, so as to receive the ink after passing through the aperture when the flushing is performed; and an ink discharge flow path connected to the ink receiver, when the flushing is performed, a predetermined amount of liquid is stored in the ink receiver, wherein the ink receiver is provided with a float member having a specific gravity smaller than that of the liquid, when the storage amount of the liquid in the ink receiver exceeds the predetermined amount, the float member opens a connection part of the ink receiver with the ink discharge flow path, and when storage amount of the liquid in the ink receiver becomes less than or equal to the predetermined amount, the float member closes the connection part.

5. The inkjet recording apparatus according to claim 4, wherein the float member and the connection part are made of a material having higher water repellency than other parts of the ink receiver.

6. The inkjet recording apparatus according to claim 4, wherein the float member has a spherical shape, and the connection part has a tapered shape whose diameter is decreasing from the upstream side to the downstream side in a discharge direction of the liquid.

7. The inkjet recording apparatus according to claim 6, wherein the float member is connected to a vicinity of the connection part with a string connection member.

8. The inkjet recording apparatus according to claim 4, wherein the connection part includes a support rod disposed to stand at the center, and a plurality of arcuate waste liquid holes formed around the support rod, and the float member has a toroidal shape with a center opening, in which the support rod is inserted.

9. An inkjet recording apparatus comprising:

a recording head including a plurality of nozzles for ejecting ink;

a conveyor belt configured to have a plurality of apertures, and to convey recording media one by one;

a control unit configured to control drive of the recording head and the conveyor belt to perform flushing, in which the ink is ejected from the nozzle of the recording head so as to pass through one of the plurality of apertures, at a timing different from a timing contributing to image recording;

an ink receiver disposed to be opposed to the recording head sandwiching the conveyor belt therebetween, so as to receive the ink after passing through the aperture when the flushing is performed; and an ink discharge flow path connected to the ink receiver, when the flushing is performed, a predetermined amount of liquid is stored in the ink receiver, wherein the recording head includes a cleaning liquid supplying unit configured to eject cleaning liquid to be supplied to a nozzle surface of the recording head on which the nozzles open, for cleaning the nozzle surface, the liquid is the cleaning liquid, and the control unit controls the cleaning liquid supplying unit to eject the cleaning liquid through the aperture to the ink receiver, so that a predetermined amount of the cleaning liquid is stored.

* * * * *